(12) United States Patent
Burgazzoli et al.

(10) Patent No.: US 11,934,811 B2
(45) Date of Patent: *Mar. 19, 2024

(54) CONTAINER IMAGE BUILDING USING DEPENDENCY CONTAINER IMAGES

(71) Applicant: Red Hat, Inc., Raleigh, NC (US)

(72) Inventors: Luca Burgazzoli, Milan (IT); Nicola Ferraro, Milan (IT)

(73) Assignee: Red Hat, Inc., Raleigh, NC (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/240,549

(22) Filed: Apr. 26, 2021

(65) Prior Publication Data

US 2021/0247970 A1 Aug. 12, 2021

Related U.S. Application Data

(63) Continuation of application No. 16/286,195, filed on Feb. 26, 2019, now Pat. No. 10,990,365.

(51) Int. Cl.
*G06F 9/455* (2018.01)
*G06F 8/36* (2018.01)
(Continued)

(52) U.S. Cl.
CPC ............ *G06F 8/433* (2013.01); *G06F 8/36* (2013.01); *G06F 8/70* (2013.01); *G06F 16/51* (2019.01);
(Continued)

(58) Field of Classification Search
CPC ... G06F 8/433; G06F 8/36; G06F 8/70; G06F 8/30; G06F 8/61; G06F 8/63; G06F 8/65;
(Continued)

(56) References Cited

U.S. PATENT DOCUMENTS

| 8,990,809 B1 | 3/2015 | Jacob et al. |
| 9,122,562 B1 | 9/2015 | Stickle |

(Continued)

OTHER PUBLICATIONS

Chao Zheng et al., Integrating Containers into Workflows: A Case Study Using Makeflow, Work Queue, and Docker, Jun. 15, 2015, [Retrieved on Sep. 21, 2023]. Retrieved from the internet: <URL: https://dl.acm.org/doi/pdf/10.1145/2755979.2755984> 8 Pages (31-38) (Year: 2015).*

(Continued)

*Primary Examiner* — Anibal Rivera
(74) *Attorney, Agent, or Firm* — Dority & Manning, P.A.

(57) ABSTRACT

Container image building using dependency container images. First dependency information that identifies a first set of dependencies necessary to generate a first application container image is accessed. A dependency container image index that identifies dependencies contained in one or more dependency container images is accessed. A first dependency container image of the one or more dependency container images is selected based on the dependency container image index and the first dependency information. The first dependency container image lacks at least one dependency identified in the first set of dependencies. A new dependency container image is generated using the first dependency container image and the at least one dependency. A new entry is stored in the dependency container image index that identifies the new dependency container image and each dependency contained in the new dependency container image.

15 Claims, 9 Drawing Sheets

(51) Int. Cl.

| | | |
|---|---|---|
| *G06F 8/41* | (2018.01) | |
| *G06F 8/70* | (2018.01) | |
| *G06F 9/44* | (2018.01) | |
| *G06F 16/51* | (2019.01) | |
| *G06F 21/62* | (2013.01) | |
| G06F 8/30 | (2018.01) | |
| G06F 8/61 | (2018.01) | |
| G06F 8/65 | (2018.01) | |
| G06F 8/75 | (2018.01) | |
| G06F 9/50 | (2006.01) | |
| G06F 16/188 | (2019.01) | |
| G06F 16/901 | (2019.01) | |

(52) U.S. Cl.
CPC ............... *G06F 8/30* (2013.01); *G06F 8/443* (2013.01); *G06F 8/61* (2013.01); *G06F 8/63* (2013.01); *G06F 8/65* (2013.01); *G06F 8/75* (2013.01); *G06F 9/455* (2013.01); *G06F 9/45545* (2013.01); *G06F 9/5077* (2013.01); *G06F 9/5088* (2013.01); *G06F 16/188* (2019.01); *G06F 16/9014* (2019.01)

(58) Field of Classification Search
CPC ... G06F 8/60; G06F 8/443; G06F 8/75; G06F 16/51; G06F 16/9014; G06F 16/188; G06F 9/455; G06F 9/45545; G06F 9/5088; G06F 9/5077; G06F 9/45558
See application file for complete search history.

(56) References Cited

U.S. PATENT DOCUMENTS

| | | | |
|---|---|---|---|
| 9,342,273 B1 | 5/2016 | Kumar et al. | |
| 9,367,305 B1 | 6/2016 | Kumar et al. | |
| 9,569,180 B1 | 2/2017 | Jiang et al. | |
| 9,898,393 B2 | 2/2018 | Moorthi et al. | |
| 10,120,671 B1 | 11/2018 | Li et al. | |
| 10,496,987 B2 | 12/2019 | Zhang | |
| 10,503,623 B2 | 12/2019 | Keller | |
| 10,528,337 B1 | 1/2020 | Varadharajan Kannan | |
| 10,540,147 B2 * | 1/2020 | Parees | G06F 8/71 |
| 10,642,896 B2 | 5/2020 | Bequet et al. | |
| 10,922,090 B1 * | 2/2021 | Lieberman | G06F 9/455 |
| 11,573,814 B1 | 2/2023 | Aithal et al. | |
| 11,573,817 B2 * | 2/2023 | Schkufza | G06F 8/41 |
| 2006/0277542 A1 | 12/2006 | Wipfel | |
| 2012/0084769 A1 | 4/2012 | Adi et al. | |
| 2012/0243795 A1 | 9/2012 | Head et al. | |
| 2016/0378525 A1 | 12/2016 | Bjorkengren | |
| 2017/0068676 A1 | 3/2017 | Jayachandran et al. | |
| 2017/0315795 A1 | 11/2017 | Keller | |
| 2017/0329588 A1 * | 11/2017 | Lundberg | G06F 9/44521 |
| 2018/0024850 A1 | 1/2018 | Caro Estevez | |
| 2018/0046446 A1 | 2/2018 | Turovsky et al. | |
| 2018/0074748 A1 | 3/2018 | Makin et al. | |
| 2018/0075152 A1 | 3/2018 | Zhang | |
| 2018/0129479 A1 * | 5/2018 | McPherson | G06F 8/63 |
| 2018/0136931 A1 | 5/2018 | Hendrich et al. | |
| 2018/0136959 A1 | 5/2018 | Vyas et al. | |
| 2018/0287883 A1 | 10/2018 | Joshi et al. | |
| 2018/0288129 A1 * | 10/2018 | Joshi | H04L 43/20 |
| 2018/0307524 A1 | 10/2018 | Vyas et al. | |
| 2019/0012162 A1 | 1/2019 | Vaikar | |
| 2019/0220266 A1 | 7/2019 | Doshi et al. | |
| 2019/0294778 A1 | 9/2019 | De Gaetano et al. | |
| 2019/0294780 A1 | 9/2019 | Melamed et al. | |
| 2019/0306173 A1 | 10/2019 | Reddy et al. | |
| 2019/0310872 A1 | 10/2019 | Griffin et al. | |
| 2020/0034167 A1 | 1/2020 | Parthasarathy et al. | |
| 2020/0142680 A1 | 5/2020 | Varadharajan Kannan | |
| 2020/0241867 A1 * | 7/2020 | Gainsborough | G06F 8/63 |
| 2020/0272440 A1 | 8/2020 | Burgazzoli et al. | |
| 2020/0293354 A1 * | 9/2020 | Song | G06F 11/1438 |

OTHER PUBLICATIONS

Author Unknown, "A methodology for packaging Python and Django applications using Docker," github.com/cloudhotspot/pypackage-docker, accessed on Oct. 30, 2018, 9 pages.

Author Unknown, "Assembly," maven.apache.org/plugins/maven-assembly-plugin/assembly.html, accessed Jan. 11, 2019, Apache Software Foundation, 15 pages.

Picozzi, Stefano, et al., "Custom Image Builds," DevOps with OpenShift, Chapter 6, www.oreilly.com/library/view/devops-with-openshift/9781491975954/ch06.html, accessed on Dec. 3, 2018, Safari Books Online, 3 pages.

Author Unknown, "Docker-compose.yml file that builds a base image, then children based on it?," stackoverflow.com/questions/45173574/docker-compose-yml-file-that-builds-a-base-image-then-children-based-on-it, accessed on Oct. 30, 2018, 5 pages.

Author Unknown, "Event Data Docker Base Image," github.com/CrossRef/event-data-docker-base, accessed on Oct. 30, 2018, 1 page.

Gerlach, W. et al., "Skyport—Container-Based Execution Environment Management for Multi-Cloud Scientific Workflows," 2014 5th International Workshop on Data-Intensive Computing in the Clouds, Nov. 21, 2014, New Orleans, LA, IEEE, pp. 25-32.

Jessica G., "Digging Into Docking Layers," Medium, medium.com/@jessgreb01/digging-into-docker-layers-c22f948ed612, Nov. 12, 2016, 9 pages.

Namba, Lee, "Docker Reference Architecture: Development Pipeline Best Practices Using Docker EE," success.docker.com/article/dev-pipeline, accessed on Oct. 30, 2018, Docker Inc., 8 pages.

Zheng, C. et al., "Integrating Containers into Workflows: A Case Study Using Makeflow, Work Queue, and Docker," Proceedings of the 8th International Workshop on Virtualization Technologies in Distributed Computing (VTDC'15), Jun. 15, 2015, ACM, pp. 31-38.

Non-Final Office Action for U.S. Appl. No. 16/286,195, dated Feb. 3, 2020, 16 pages.

Non-Final Office Action for U.S. Appl. No. 16/286,195, dated Jun. 24, 2020, 17 pages.

Notice of Allowance and Interview Summary for U.S. Appl. No. 16/286,195, dated Jan. 4, 2021, 24 pages.

\* cited by examiner

CONTAINER IMAGE BUILDING USING DEPENDENCY CONTAINER IMAGES

RELATED APPLICATION

This application is a continuation of U.S. patent Ser. No. 10/990,365, filed on Feb. 26, 2019, entitled "CONTAINER IMAGE BUILDING USING DEPENDENCY CONTAINER IMAGES," which is hereby incorporated herein by reference in its entirety.

BACKGROUND

It is common for a software developer to write a complex computer program that, during compilation of the source code, and/or during the execution of the resulting executable file, will require external, pre-existing files to either compile properly or execute properly. Such external, pre-existing files are sometimes referred to as dependencies. In the compilation phase, for example, a dependency may include one or more source code files that define entrypoints of an executable library that provide a desired, pre-existing functionality that the complex computer program utilizes. The source code files allow the compiler to generate appropriate executable code associated with function invocations of the executable library contained in the complex computer program. In the execution phase, for example, the dependency may be an executable library that is invoked by the complex computer program to implement the desired functionality.

SUMMARY

The examples disclosed herein include a container image builder that maintains dependency container images that contain dependencies that may be used in constructing an application container image that, when run, implements an executable version of an application. The container image builder, as part of a container image build process, accesses a descriptor file that is associated with an application, and that identifies the dependencies needed to generate an application container image that implements the executable version of the application. The container image builder accesses a container image repository, and, based on a selection mechanism utilized by the container image builder and the dependencies identified in the descriptor file, selects a particular dependency container image from the container image repository.

In one example a first method is provided that includes accessing first dependency information that identifies a first set of dependencies necessary to generate a first application container image. The method further includes accessing a dependency container image index that identifies dependencies contained in one or more dependency container images. The method further includes selecting, based on the dependency container image index and the first dependency information, a first dependency container image of the one or more dependency container images, the first dependency container image lacking at least one dependency identified in the first set of dependencies. The method further includes generating a new dependency container image using the first dependency container image and the at least one dependency. The method further includes storing a new entry in the dependency container image index that identifies the new dependency container image and each dependency contained in the new dependency container image.

In another example a second method is provided that includes accessing first dependency information that identifies a first set of dependencies necessary to generate a first application container image. The method further includes accessing a dependency container image index that identifies dependencies contained in one or more dependency container images. The method further includes selecting, based on the dependency container image index and the first dependency information, a first dependency container image of the one or more dependency container images. The method further includes generating the first application container image from the first dependency container image and any dependencies identified in the first set of dependencies that are not contained in the first dependency container image.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
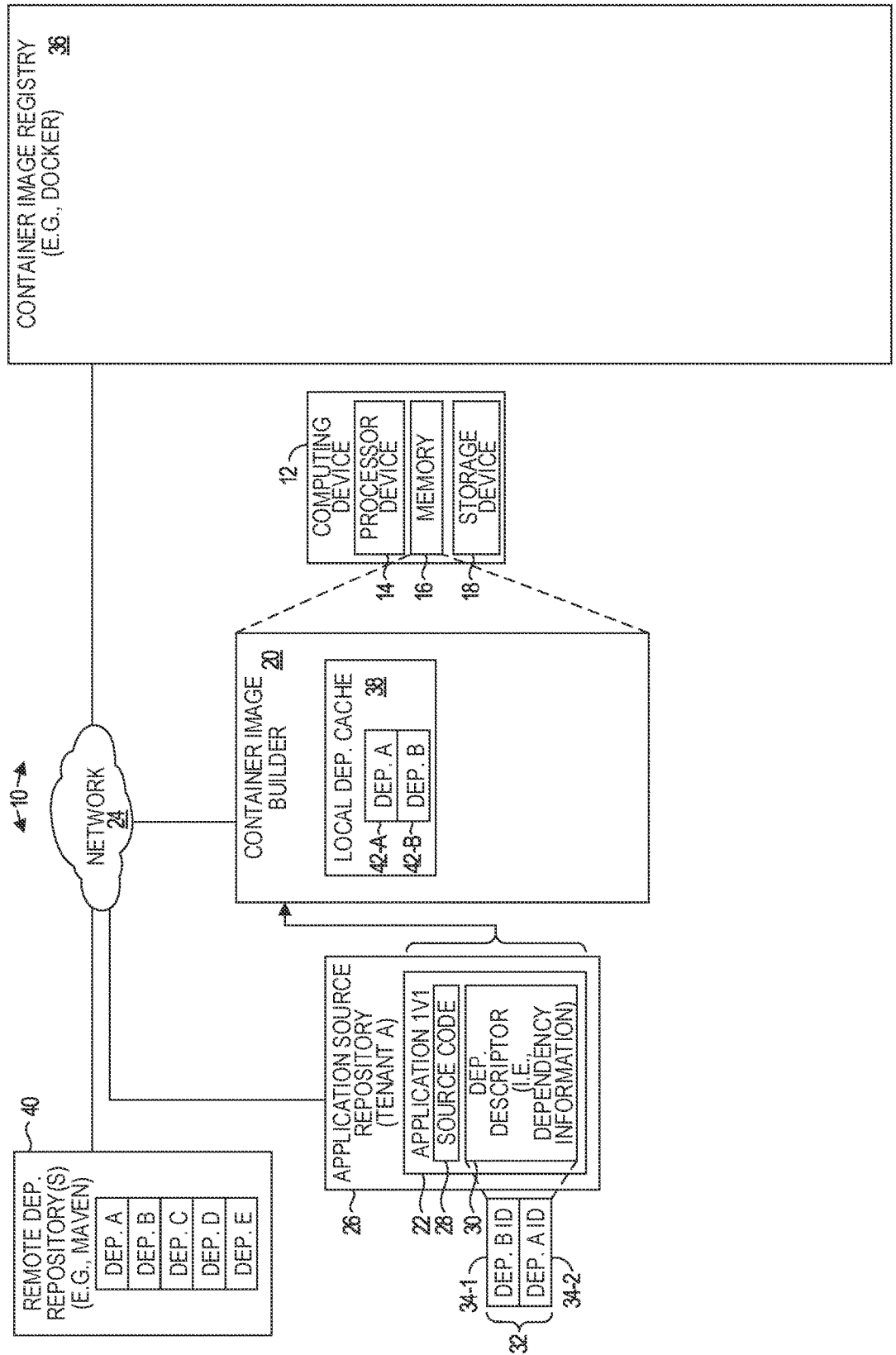
FIGS. 1A-1E are block diagrams of an environment at successive periods of time in which examples disclosed herein may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

It is common for a software developer to write a complex computer program that, during compilation of the source code, and/or during the execution of the resulting executable file, will require external, pre-existing files to either compile properly or execute properly. Such external, pre-existing files are sometimes referred to as dependencies. In the compilation phase, for example, a dependency may include one or more source code files that define entrypoints of an executable library that provide a desired, pre-existing functionality that the complex computer program utilizes. The source code files allow the compiler to generate appropriate executable code associated with function invocations of the executable library contained in the complex computer program. In the execution phase, for example, the dependency may be an executable library that is invoked by the complex computer program to implement the desired functionality.

It is necessary for these dependencies to be available at the appropriate stage, such as the build phase, the execution phase, or both, for the program to work properly. Often, programs utilize many of the same dependencies. For example, many programs written for execution in a particular cloud computing environment may all utilize a particular web server, and thus each program may require the dependencies associated with the use of the particular web server.

Containerization technologies, such as, by way of non-limiting example, Docker® container technology, Kubernetes container technology, CoreOS (Rocket) container technology, Tectonic container technology, and the like, are increasingly popular due, in part, to their relatively low resource requirements compared to other process isolation mechanisms, such as virtual machines. Containerization technologies are also popular for implementing functionality in a cloud computing environment.

The development of software is highly automated today. Technologies, such as OpenShift® Source-To-Image (S2I), facilitate the automated generation of a container image from the source code files associated with an application. This greatly reduces the efforts required to generate executable container images in development and production environments.

In order for a container image to be built, the source code files associated with the program and all dependencies must be available during the container image generation stage. Typically, an automated build tool, for each container image to be built, determines what dependencies are needed, and then downloads the appropriate dependencies to a particular directory, and then initiates the build. Dependencies vary in size, but often may be relatively large, such as 100 MB or more in size. Copying dependencies in a high-volume environment can utilize a substantial amount of processor cycles, network bandwidth, and storage space. Applications are often modified to correct bugs, or to add features, and after each such revision or set of revisions, a new container image must then again be generated. Conventional container image build/generation processes start each new container image build from scratch, downloading dependencies where needed and generating a new container image, which, depending on the size of the dependencies, may require both substantial network bandwidth and substantial processing.

The examples disclosed herein substantially reduce the need to regenerate the dependency layers of a container image. The examples disclosed herein include a container image builder that maintains dependency container images that contain dependencies that may be used in constructing an application container image that, when run, implements an executable version of an application. The container image builder, as part of a container image build process, accesses a descriptor file that is associated with an application, and that identifies the dependencies needed to generate an application container image that implements the executable version of the application. The container image builder accesses a container image repository, and, based on a selection mechanism utilized by the container image builder and the dependencies identified in the descriptor file, selects a particular dependency container image from the container image repository.

If a dependency container image contains the same set of dependencies as those needed to generate the application container image, the container image builder selects the dependency container image, and then generates the application container image using the selected dependency container image and the source code files associated with the application. Because the dependency container image already contains the needed dependencies, those container layers need not be regenerated for the new application container image.

If no dependency container image in the container image repository contains the same set of dependencies as those needed to generate the application container image, the container image builder may, based on the selection mechanism, select a dependency container image that contains a subset of the dependencies needed to generate the application container image. The container image builder may then obtain the missing dependencies, generate a new dependency container image based on the selected dependency container image and the downloaded dependencies, and then store the new dependency container image in the container image repository so that the new dependency container image will be available for subsequent application container image builds. The container image builder also generates the application container image using the new dependency container image and the source code files associated with the application.

The generation, maintenance, and use of the container image repository substantially reduce the need to download dependencies for an application container image because the dependencies may already exist in a container image repository. The examples disclosed herein also greatly reduce the amount of time needed to generate an application container image because the container image build starts from an existing dependency container image that contains the relevant dependencies. Moreover, by separating the layers of the dependencies from the executable in the application container image, the examples disclosed herein greatly reduce the need for a runtime compute node that runs the application container image to download the container layers that contain the dependencies, because such container layers may already be present on the runtime compute node from running previous versions of the application container image.

FIGS. 1A-1E are block diagrams of an environment 10 at successive periods of time in which examples disclosed herein may be practiced. Referring first to FIG. 1A, the environment 10 includes a computing device 12, which in turn includes processor device 14, a memory 16, and a storage device 18. The computing device 12 executes a container image builder 20 that is configured to generate container images. The container image builder 20 can comprise any suitable containerization technology or containerization technologies capable of generating a container image, such as, by way of non-limiting example, OpenShift®, Docker®, Kubernetes, or the like, modified as discussed herein. The phrase "container" as used herein refers to Linux containers wherein the Linux kernel features cgroups and namespaces are used to isolate processes from one another. The phrase "container image" as used herein refers to a static package of software comprising one or more layers, the layers including everything needed to run an application (i.e., as a container) that corresponds to the container image, including, for example, one or more of executable runtime code, system tools, system libraries and configuration settings. A Docker® image is an example of a container image.

In some examples, the computing device 12 and container image builder 20 are part of a cloud computing environment that provides automated on-demand self-service to multiple external entities, such as different companies, or different divisions of a company, via an application programming interface (API) over a network to a shared pool of configurable computing devices used to implement requests from the external entities for computing resources, such as data storage, application execution, and database management computing resources. As an example, a first entity, sometimes referred to herein as a "tenant," such as an online retail store, may, via the API, initiate one or more containers in the cloud computing environment that provides the online retail store functionality to consumers. The tenant may initiate and terminate containers in the cloud computing environment on-demand via the API. A second entity (i.e., a second tenant), such as an online college, may, via the API, initiate one or more containers in the cloud computing environment that provides education-related services to students. The second tenant may also initiate and terminate containers in the cloud computing environment on-demand via the API. The cloud computing environment isolates the containers associated with the first tenant from those associated with the second tenant such that containers associated with the first tenant cannot access information or otherwise interact with the containers associated with the second tenant, unless the second tenant otherwise explicitly permits such access or interactions.

At some point in time, the container image builder 20 determines that an application container image for an application 22 that is associated with a first tenant A, such as an online retail store, is to be generated. This determination may be made in any number of ways. In some examples, the container image builder 20 may be communicatively coupled, via a network 24 for example, to an application source repository 26 that maintains the files associated with applications for the tenant A. In response to certain events, such as in response to a request from a user, or upon determining that a source code file associated with the application 22 has been revised, the application source repository 26 may request the container image builder 20 to generate a container image that corresponds to the application 22.

The application 22 includes one or more source code file(s) 28 and dependency information, in the form of a dependency descriptor 30, that identifies a set 32 of two dependencies 34-1-34-2 that are necessary to generate an application container image that, when executed as a container, implements the functionality of the application 22. The term "dependency" as used herein, refers to files that are necessary for the resultant container image to be generated, and/or to properly execute. Dependencies, for example, may include source code files that define entrypoints of an executable library that provide a desired, pre-existing functionality that the application 22 utilizes, or an executable library that is invoked by the application 22, or database software, or web server software, utilized by the application 22.

The dependency descriptor 30 may take any desired form and utilize any desired format, and may differ depending on the programming language associated with the application 22. For example, in a Java environment, the dependency descriptor 30 may comprise, for example, a pom.xml file. In a Node.JS environment, the dependency descriptor 30 may comprise, for example, a package.json file. In a go environment, the dependency descriptor 30 may comprise, for example, a "Gopkg" or a "go.mod" file.

Based on the dependency descriptor 30, the container image builder determines that dependencies A and B are required to generate a container image that corresponds to the application 22. The reference herein to a container image "corresponding" to an application or an application corresponding to a container image means that the container image, when executed as a container, implements the functionality of the "corresponding" application.

The container image builder 20 is communicatively coupled to one or more container image registries 36 (illustrated herein for purposes of simplicity as a single container image registry 36) that are configured to store container images. The container image registry 36 may comprise any suitable container image registry, such as, by way of non-limiting example, a Docker® container image registry. Assume that initially the container image registry 36 is empty. The container image builder 20 maintains a dependency cache 38 that stores dependencies that the container image builder 20 obtains in order to generate a container image. Assume again that initially the dependency cache 38 is empty. Because the container image builder 20 requires dependencies A and B in order to generate a container image that corresponds to the application 22, the container image builder 20 accesses a remote dependency repository 40 to obtain the dependencies A and B, and stores the dependencies A and B in the dependency cache 38 as dependencies 42-A and 42-B, respectively. The remote dependency repository 40 may comprise any storage location from which a dependency may be obtained. Different dependencies may be acquired from different remote dependency repositories. In this example, the remote dependency repository 40 stores dependencies A-E.

Figure 1B:
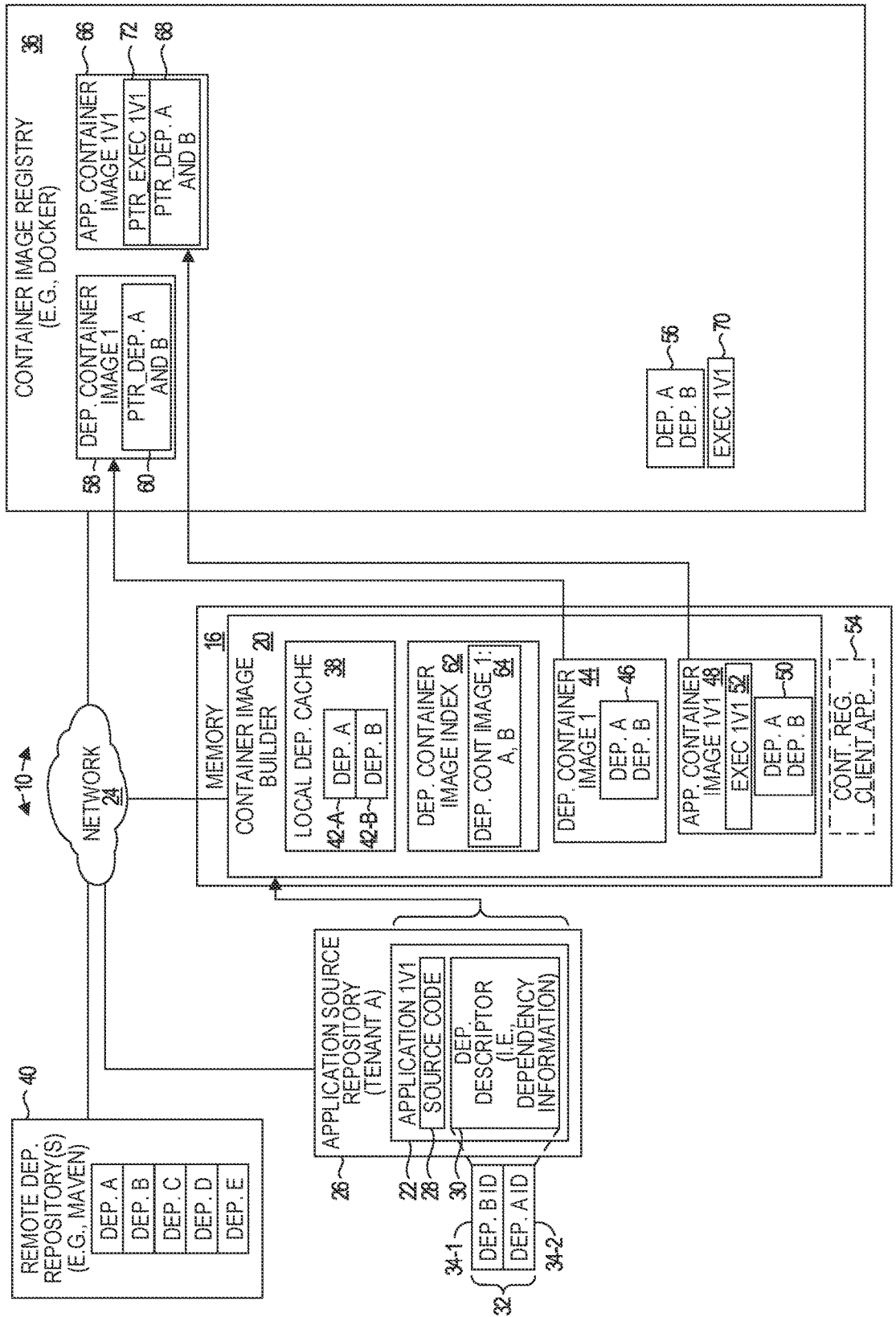

Referring now to FIG. 1B, the container image builder 20 generates a dependency container image 44 that includes a layer 46 that contains a copy of the dependencies 42-A and 42-B. Note that, solely for purposes of space, certain features of the computing device 12 that are illustrated in FIG. 1A are not illustrated in FIGS. 1B-1E. A "dependency container image" is a container image that contains only dependencies, and not a runtime or executable layer. The container image builder 20 then uses the dependency container image 44 to generate an application container image 48. The application container image 48 includes a layer 50 that is a copy of the layer 46 and which includes copies of the dependencies 42-A and 42-B. The application container image 48 also includes a layer 52, which is an executable that is generated based at least in part on the source code file(s) 28.

The container image builder 20 requests that the dependency container image 44 be stored in the container image registry 36. In some examples, the container image registry 36 may have a container registry client application 54 that executes on the computing device 12, and works in conjunction with the container image builder 20 and the container image registry 36 when a container is to be stored in the container image registry 36. Upon receiving a request from the container image builder 20 to store the dependency container image 44 in the container image registry 36, the container registry client application 54 hashes the layer 46 to generate a hash value and sends the hash value to the container image registry 36. The container image registry 36 compares the hash value to the hash values of previously stored layers, and determines that the container image registry 36 currently does not have a copy of the layer 46. The container registry client application 54 then sends the dependency container image 44 and a copy of the layer 46 to the container image registry 36.

In some examples, as part of the process of ingesting a container image, the container image registry 36 makes a copy of each layer of the container image and stores the copy of the layer separately from the container image. In this example, the container image registry 36 generates a layer 56, which is a copy of the layer 46, and which contains copies of the dependencies 42-A and 42-B. The container image registry 36 generates a dependency container image 58 that includes a layer 60 that points to, or otherwise references, the layer 56. In some examples, the layer 60 may comprise the hash value that matches the hash value of the layer 56. The layer 60 utilizes substantially less space than the layer 56.

The container image builder 20 generates a dependency container image index 62 that will be used to identify dependency container images and the dependencies contained in the dependency container images. The container image builder 20 generates an entry 64 in the dependency container image index 62 that identifies the dependency container image 58 and that indicates that the dependency container image 58 contains the dependencies 42-A and 42-B.

The container image builder 20 then requests that the application container image 48 be stored in the container image registry 36. Upon receiving the request from the container image builder 20 to store the application container image 48 in the container image registry 36, the container registry client application 54 hashes the layer 50 to generate a hash value and sends the hash value to the container image registry 36. The container image registry 36 compares the hash value to the hash values of the previously stored layer 56 and determines that the hash values match. The container image registry 36 generates an application container image 66 that includes a layer 68 that points to, or otherwise references, the layer 56. Because the container image registry 36 already contained a copy of the layer 50, the container registry client application 54 need not send the copy of the layer 50 to the container image registry 36. The container registry client application 54 hashes the layer 52 to generate a hash value, and sends the hash value to the container image registry 36. The container image registry 36 determines that the container image registry 36 has not previously stored the layer 52. The container registry client application 54 then sends the layer 52 to the container image registry 36. The container image registry 36 generates a layer 70 which is a copy of the layer 52. The container image registry 36 includes, in the application container image 66 a pointer 72 that points to, or otherwise references, the layer 70.

In some examples, the container image builder 20 may then delete the dependency container image 44 and application container image 48 from the memory 16.

Figure 1C:
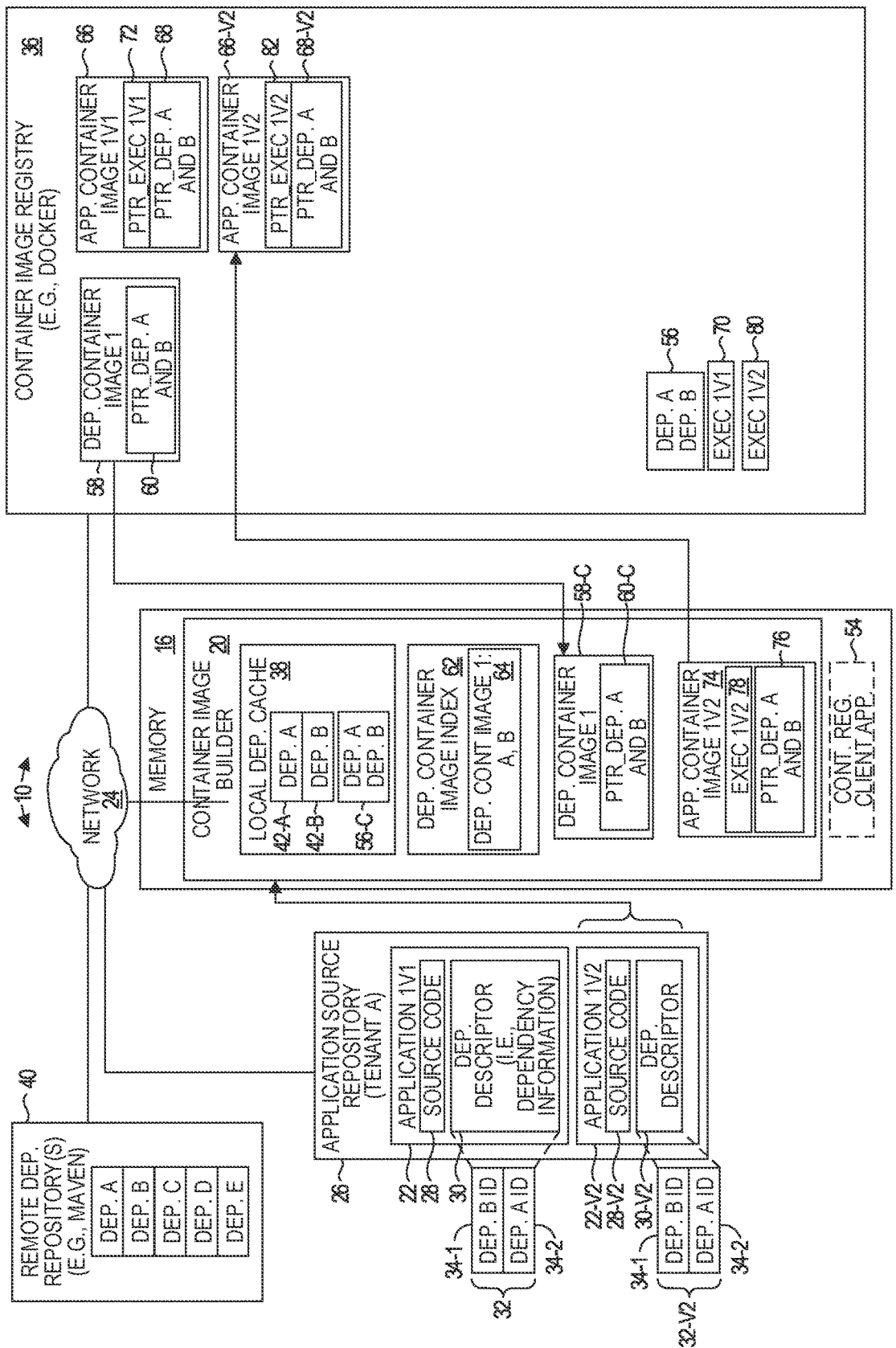

Referring now to FIG. 1C, assume that the source code file(s) 28 of the application 22 is revised and saved as a second version source code file(s) 28-V2 of a second version application 22-V2 of the application 22. The revisions did not result in any changes in any of the dependencies that were previously required for the application 22; so a dependency descriptor 30-V2 of the application 22-V2 identifies the same set 32-V2 of dependencies A and B as that identified by the dependency descriptor 30. The container image builder 20 determines that an application container image for the application 22-V2 is to be generated. Based on the dependency descriptor 30-V2, the container image builder 20 determines that dependencies A and B are required to generate a container image that corresponds to the application 22-V2.

The container image builder 20 accesses the dependency container image index 62 and determines that the entry 64 identifies the dependency container image 58 in the container image registry 36 as having the dependencies A and B, and that the dependency container image 58 does not include additional dependencies not required by the application 22-V2. The container image builder 20 obtains the dependency container image 58 from the container image registry 36 and stores a copy 58-C of the dependency container image 58 in the memory 16. The copy 58-C contains a copy 60-C of the layer 60. Because the local dependency cache 38 does not include a copy of the dependency layer 56, the dependency layer 56 is also copied to the local dependency cache 38 as a copy 56-C of the dependency layer 56. The container image builder 20 generates a new application container image 74 from the dependency container image 58-C. The new application container image 74 includes a layer 76 that is a copy of the layer 60-C and that includes pointers to the dependencies 42-A and 42-B. The application container image 74 also includes a layer 78 which is an executable that is generated based at least in part on the source code file(s) 28-V2.

The container image builder 20 then requests that the application container image 74 be stored in the container image registry 36. Upon receiving the request from the container image builder 20 to store the application container image 74 in the container image registry 36, the container registry client application 54 determines that the layer 76 includes pointers that refer to a layer already stored in the container image registry 36, and sends the layer 76 to the container image registry 36. The container image registry 36 generates an application container image 66-V2 that includes a layer 68-V2, which is a copy of the layer 76 and points to the layer 56 that contains the dependencies A and B. The container registry client application 54 hashes the layer 78 to generate a hash value, and sends the hash value to the container image registry 36. The container image registry 36 determines that the container image registry 36 has not previously stored the layer 78. The container registry client application 54 then sends the layer 78 to the container image registry 36. The container image registry 36 generates a layer 80 that is a copy of the layer 78. The container image registry 36 includes, in the application container image 66-V2 a layer 82 that points to, or otherwise references, the layer 80.

In some examples, the container image builder 20 may then delete the dependency container image 58-C and application container image 74 from the memory 16.

Figure 1D:
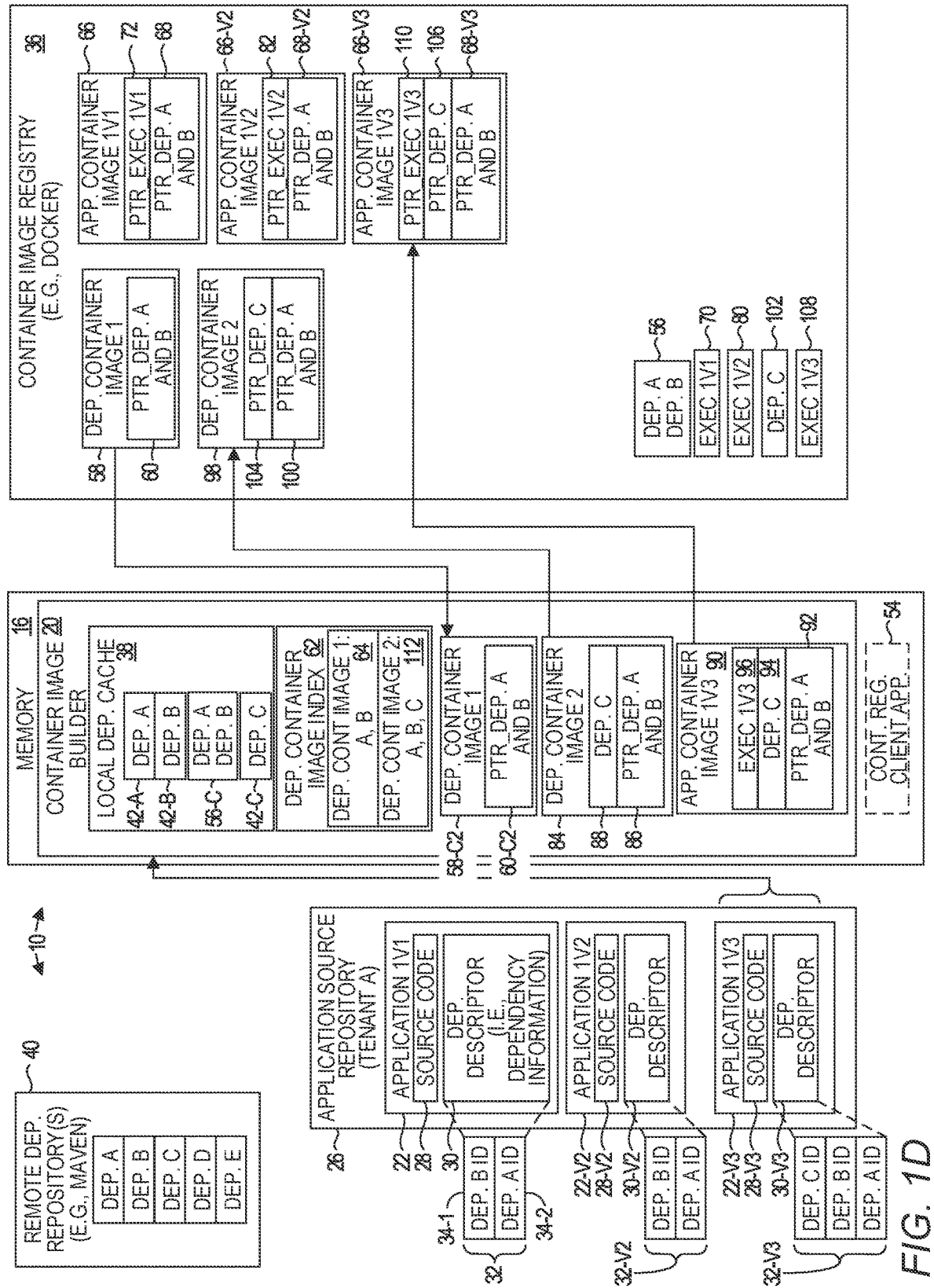

Referring now to FIG. 1D, assume that the source code file(s) 28-V2 of the application 22-V2 is revised and saved as a third version source code file(s) 28-V3 of a third version application 22-V3 of the application 22. In this example, the revisions added a new dependency C. Accordingly, a dependency descriptor 30-V3 of the application 22-V3 identifies a set 32-V3 of dependencies A, B, and C as being necessary to generate an application container image that corresponds to the application 22-V3. The container image builder 20 determines that an application container image for the application 22-V3 is to be generated. Based on the dependency descriptor 30-V3, the container image builder 20 determines that dependencies A, B, and C are required to generate an application container image that corresponds to the application 22-V3. Note that, solely for purposes of space, the network 24 has been omitted from FIG. 1D.

The container image builder 20 accesses the dependency container image index 62 and determines that the entry 64 identifies the dependency container image 58 in the container image registry 36 as having the dependencies A and B. Since no other dependency container image in the container image registry 36 contains each of the dependencies A, B, and C, and no other dependencies, the container image builder 20 determines that the dependency container image 58 is the best dependency container image to utilize for generating an application container image that corresponds to the application 22-V3.

The container image builder 20 obtains the dependency container image 58 from the container image registry 36 and stores a copy 58-C2 of the dependency container image 58 in the memory 16. The copy 58-C2 contains a copy 60-C2 of the layer 60. The container image builder 20 accesses the remote dependency repository 40 to obtain the dependency C, and stores the dependency C in the dependency cache 38 as dependency 42-C.

The container image builder 20 generates a dependency container image 84 from the dependency container image 58-C2 and the dependency 42-C. The generated dependency container image 84 includes a layer 86 that is a copy of the layer 60-C2 of the dependency container image 58-C2, and a layer 88 that includes the dependency 42-C. The container image builder 20 then uses the dependency container image 84 to generate a new application container image 90 that includes a layer 92 that is a copy of the layer 86, and which includes pointers to the dependencies 42-A and 42-B. The application container image 90 also includes a layer 94 that includes the dependency 42-C. The application container image 74 also includes a layer 96 which is an executable that is generated based at least in part on the source code file(s) 28-V3.

The container image builder 20 requests that the dependency container image 84 be stored in the container image registry 36. Upon receiving the request from the container image builder 20 to store the dependency container image 84 in the container image registry 36, the container registry client application 54 determines that the layer 86 includes pointers that refer to a layer already stored in the container image registry 36, and sends the layer 86 to the container image registry 36. The container image registry 36 generates a dependency container image 98 that includes a layer 100, which is a copy of the layer 86 and which points to the layer 56 that contains the dependencies A and B. The container registry client application 54 hashes the layer 88 (containing the dependency C) to generate a hash value, and sends the hash value to the container image registry 36. The container image registry 36 determines that the container image registry 36 has not previously stored the layer 88. The container registry client application 54 then sends the layer 88 to the container image registry 36. The container image registry 36 generates a layer 102 which is a copy of the layer 88. The container image registry 36 includes, in the dependency container image 98 a layer 104 that contains a pointer that points to, or otherwise references, the layer 102.

The container image builder 20 then requests that the application container image 90 be stored in the container image registry 36. Upon receiving the request from the container image builder 20 to store the application container image 90 in the container image registry 36, the container registry client application 54 determines that the layer 92 refers to a layer already stored in the container image registry 36, and sends the layer 92 to the container image registry 36. The container image registry 36 generates an application container image 66-V3 that includes a layer 68-V3, which is a copy of the layer 92 and points to the layer 56 that contains the dependencies A and B. The container registry client application 54 hashes the layer 94 to generate a hash value, and sends the hash value to the container image registry 36. The container image registry 36 compares the hash value to the hash values of the previously stored layer 102 and determines that the hash values match. The container image registry 36 generates a layer 106 in the application container image 66-V3 that includes a pointer that points to, or otherwise references, the layer 102. Because the container image registry 36 already contained a copy of the layer 94, the container registry client application 54 need not send the copy of the layer 94 to the container image registry 36.

The container registry client application 54 hashes the layer 96 to generate a hash value, and sends the hash value to the container image registry 36. The container image registry 36 determines that the container image registry 36 has not previously stored the layer 96. The container registry client application 54 then sends the layer 96 to the container image registry 36. The container image registry 36 generates a layer 108 which is a copy of the layer 96. The container image registry 36 includes, in the application container image 66-V3 a layer 110 that points to, or otherwise references, the layer 108.

The container image builder 20 generates an entry 112 in the dependency container image index 62 that identifies the dependency container image 98 and that indicates that the dependency container image 98 contains the dependencies 42-A, 42-B, and 42-C. In some examples, the container image builder 20 may then delete the dependency container images 58-C2, 84 and the application container image 90 from the memory 16.

Figure 1E:
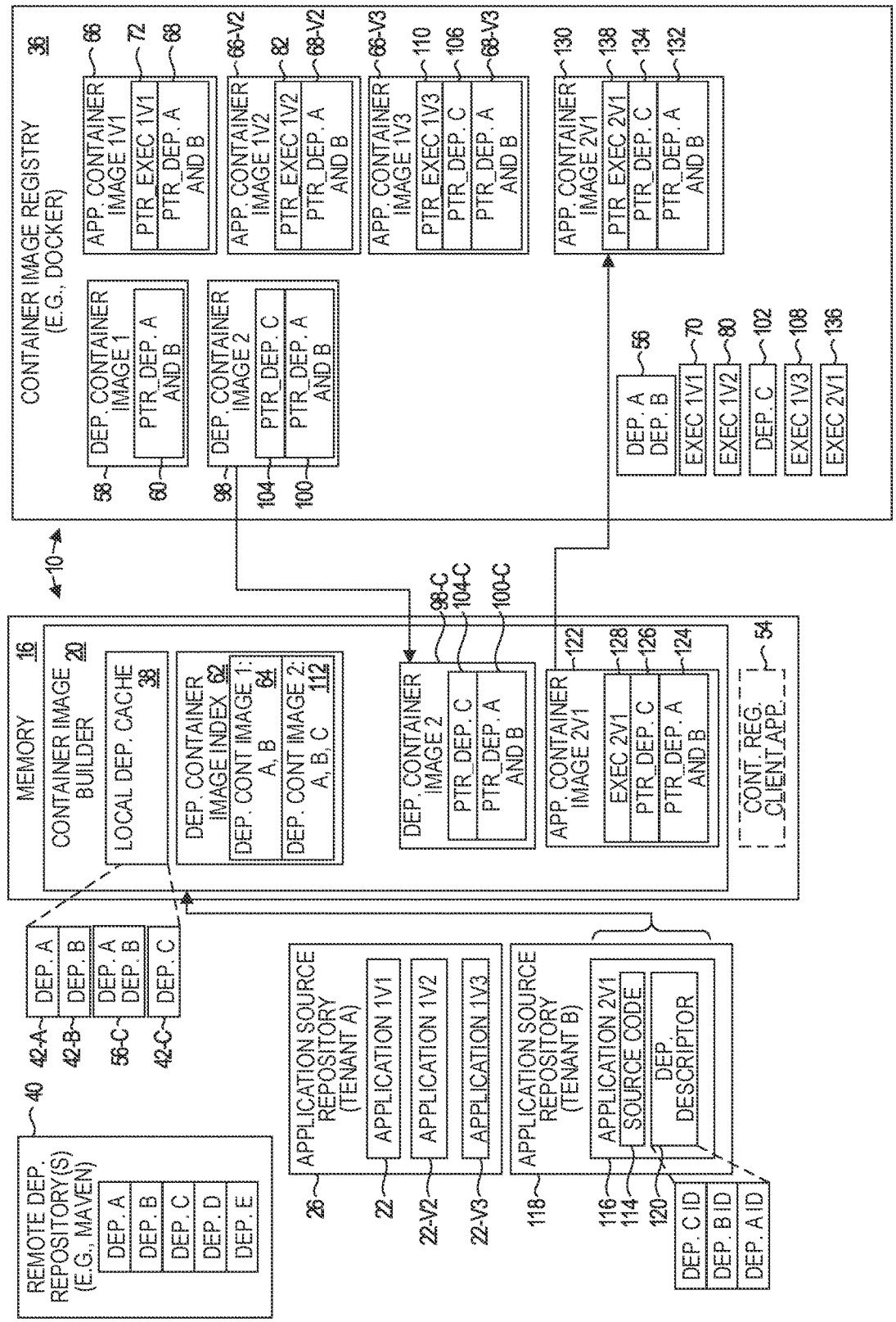

Referring now to FIG. 1E, assume that a new source code file 114 of an application 116 associated with a different tenant B, such as an educational institution, is saved in an application source repository 118 to which the container image builder 20 is communicatively coupled. Based on a dependency descriptor 120 associated with the application 116, the container image builder determines that dependencies A, B, and C are required to generate a container image that corresponds to the application 116. Note that, solely for purposes of space, aspects of the applications 22, 22-V2, and 22-V3 have been omitted from FIG. 1E.

The container image builder 20 accesses the dependency container image index 62 and determines that the entry 112 identifies the dependency container image 98 in the container image registry 36 as having the dependencies A, B, and C. Since no other dependency container image in the container image registry 36 contains each of the dependencies A, B, and C and no other dependencies, the container image builder 20 determines that the dependency container image 98 is the best dependency container image to utilize for generating an application container image that corresponds to the application 116. Note that the dependency container image 98 was originally created based on the application 22-V3 associated with tenant A, but, because the dependency container image 98 contains no proprietary software, such as the layer 110, the dependency container image 98 can be used to generate application container images for any tenant that utilizes the cloud computing environment 10.

The container image builder 20 obtains the dependency container image 98 from the container image registry 36 and stores a copy 98-C of the dependency container image 58 in the memory 16. The copy 98-C contains a copy 100-C of the layer 100 that contains a pointer to the layer 56 (dependencies A and B) and a copy 104C of the layer 104 that contains a pointer to the layer 102 (dependency C). The container image builder 20 generates a new application container image 122 from the dependency container image 98-C and the source code files 114. The new application container image 122 includes a layer 124 that is a copy of the layer 100-C, and which includes pointers to the dependencies 42-A and 42-B. The application container image 122 also includes a layer 126 that is a copy of the layer 104-C, and which includes a pointer to the dependency 42-C. The application container image 122 also includes a layer 128 which is an executable that is generated based at least in part on the source code file(s) 114.

The container image builder 20 then requests that the application container image 122 be stored in the container image registry 36. Upon receiving the request from the container image builder 20 to store the application container image 122 in the container image registry 36, the container registry client application 54 determines that the layer 124 includes pointers that refer to a layer already stored in the container image registry 36, and sends the layer 124 to the container image registry 36. The container image registry 36 generates an application container image 130 that includes a layer 132, which is a copy of the layer 124 and points to the layer 56 that contains the dependencies A and B. A similar process occurs to generate a new layer 134 that contains a pointer to the layer 102 that contains the dependency C. The container registry client application 54 hashes the layer 128 to generate a hash value, and sends the hash value to the container image registry 36. The container image registry 36 determines that the container image registry 36 has not previously stored the layer 128. The container registry client application 54 then sends the layer 128 to the container image registry 36. The container image registry 36 generates a layer 136 which is a copy of the layer 128. The container image registry 36 includes, in the application container image 130 a layer 138 that contains a pointer that points to, or otherwise references, the layer 136. In some examples, the container image builder 20 may then delete the dependency container image 98-C and application container image 122 from the memory 16.

Figure 2:
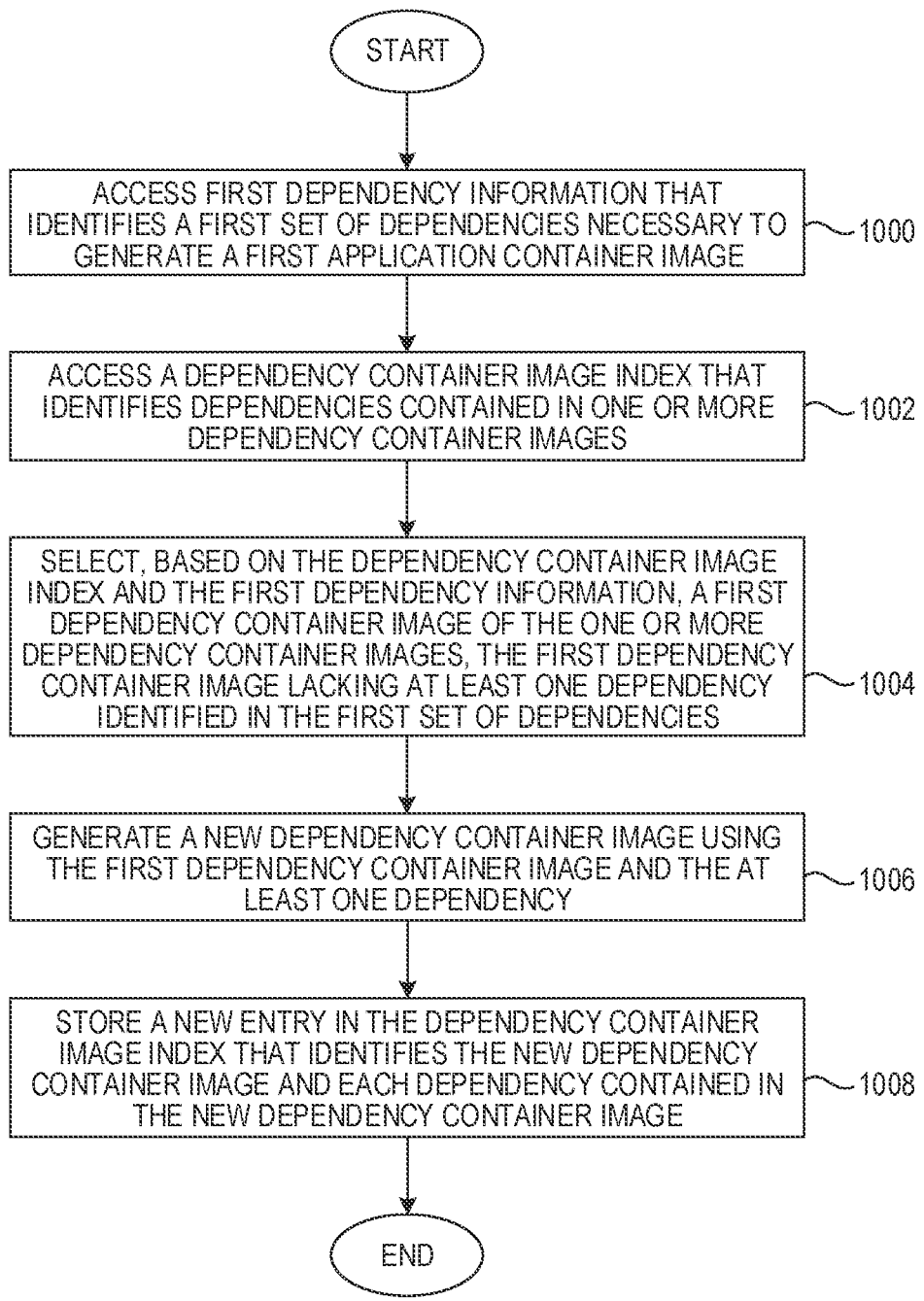
FIG. 2 is a flowchart of a method for generating a dependency container image according to one example.

FIG. 2 is a flowchart of a method for generating a dependency container image according to one example. FIG. 2 will be discussed in conjunction with FIG. 1D. The container image builder 20 accesses dependency information, in the form of the dependency descriptor 30-V3, that identifies the set 32-V3 of dependencies necessary to generate the application container image 66-V3 (FIG. 2, block 1000). The container image builder 20 accesses the dependency container image index 62 that identifies dependencies contained in one or more dependency container images (FIG. 2, block 1002). The container image builder 20 selects, based on the dependency container image index 62 and the dependency information, the dependency container image 58 of the one or more dependency container images. The dependency container image 58 lacks at least one dependency identified in the set 32-V3 of dependencies (FIG. 2, block 1004). In particular, in this example, the dependency container image 58 lacks the dependency C. The container image builder 20 generates the new dependency container image 84 using the dependency container image 58-C2 and the dependency C (FIG. 2, block 1006). The container image builder 20 stores the new entry 112 in the dependency container image index 62 that identifies the new dependency container image 84 and each dependency contained in the new dependency container image 84 (FIG. 2, block 1008).

Figure 3:
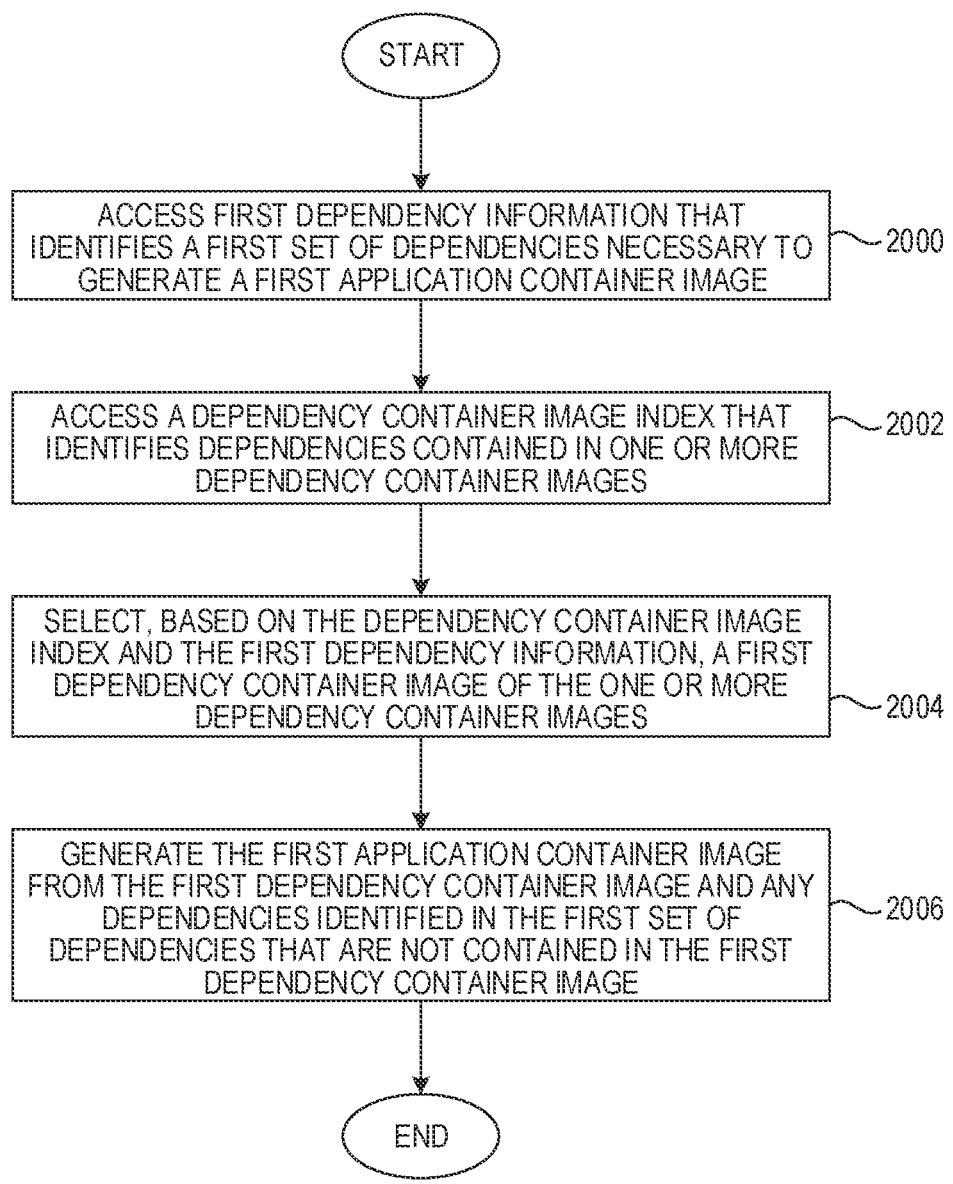
FIG. 3 is a flowchart of a method for generating an application container image from a dependency container image according to one example.

FIG. 3 is a flowchart of a method for generating an application container image from a dependency container image according to one example. FIG. 3 will be discussed on conjunction with FIG. 1C. The container image builder 20 accesses the dependency information, in the form of the dependency descriptor 30-V2, that identifies the set 32-V2 of dependencies necessary to generate the application container image 74 (FIG. 3, block 2000). The container image builder 20 accesses the dependency container image index 62 that identifies dependencies contained in one or more dependency container images stored in the container image registry 36 (FIG. 3, block 2002). The container image builder 20 selects, based on the dependency container image index 62 and the dependency information, the dependency container image 58 (FIG. 3, block 2004). The container image builder 20 generates the application container image 74 from the dependency container image 58-C and any dependencies identified in the set 32-V2 of dependencies that are not contained in the dependency container image 58-C (FIG. 3, block 2006).

Figure 4:
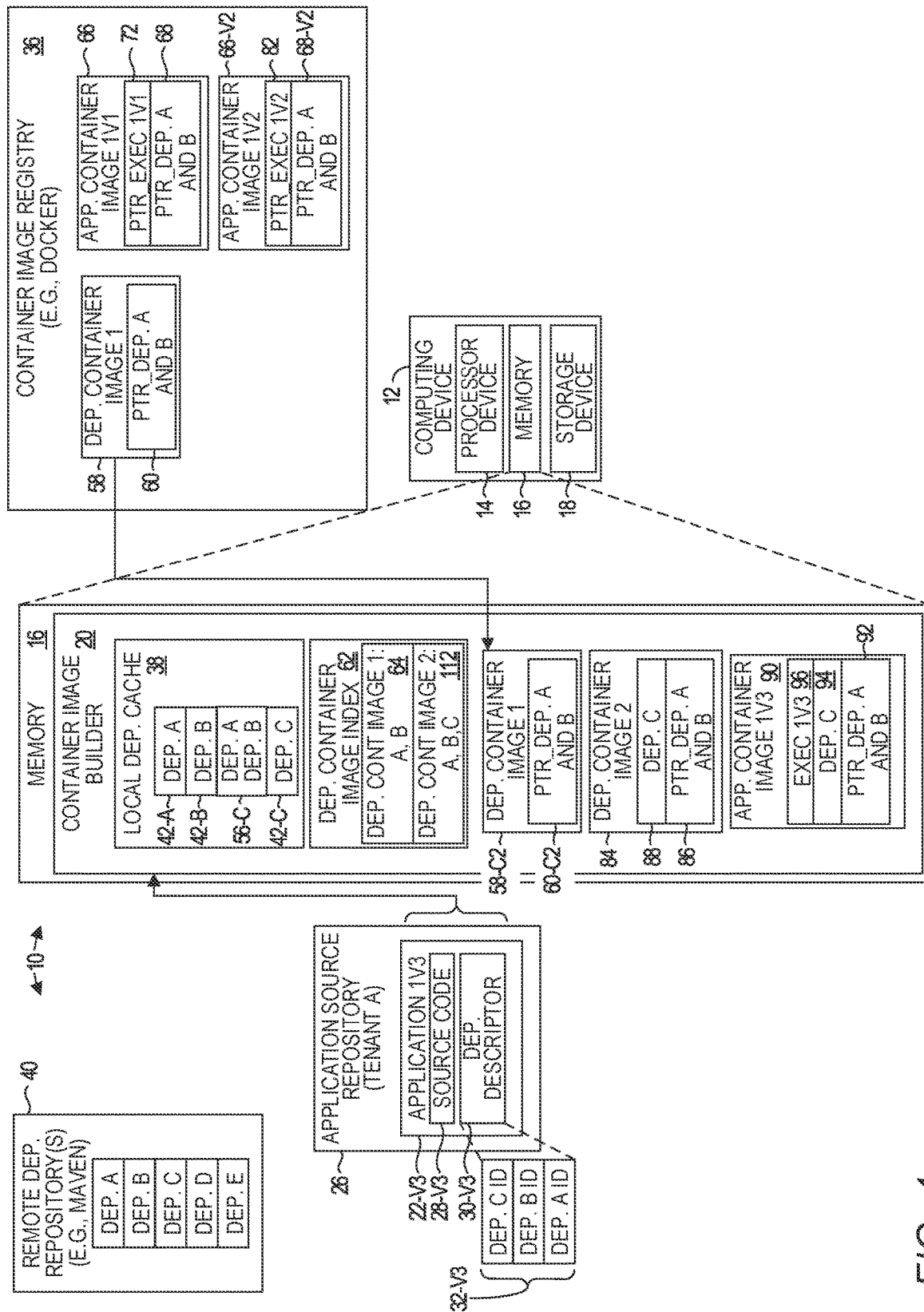
FIG. 4 is a simplified block diagram of the environment illustrated in FIG. 1D according to another example.

FIG. 4 is a simplified block diagram of the environment 10 illustrated in FIG. 1D according to another example. Because the container image builder is a component of the computing device 12, functionality implemented by the container image builder 20 may be attributed to the computing device 12 generally. Moreover, in examples where the container image builder 20 comprises software instructions that program the processor device 14 to carry out functionality discussed herein, functionality implemented by the container image builder 20 may be attributed herein to the processor device 14. The computing device 12 includes the memory 16 and the processor device 14 coupled to the memory 16. The processor device 14 is to access dependency information, in the form of the dependency descriptor 30-V3, that identifies the set 32-V3 of dependencies necessary to generate the application container image 90. The processor device 14 is further to access the dependency container image index 62 that identifies dependencies contained in one or more dependency container images. The processor device 14 is further to select, based on the dependency container image index 62 and the dependency information, the dependency container image 58 of the one or more dependency container images. The dependency container image 58 lacks at least one dependency identified in the set 32-V3 of dependencies. In particular, in this example, the dependency container image 58 lacks the dependency C. The processor device 14 is further to generate the new dependency container image 84 using the dependency container image 58-C2 and the dependency C. The processor device 14 is further to store a new entry 112 in the dependency container image index 62 that identifies the new dependency container image 84 and each dependency contained in the new dependency container image 84.

Figure 5:
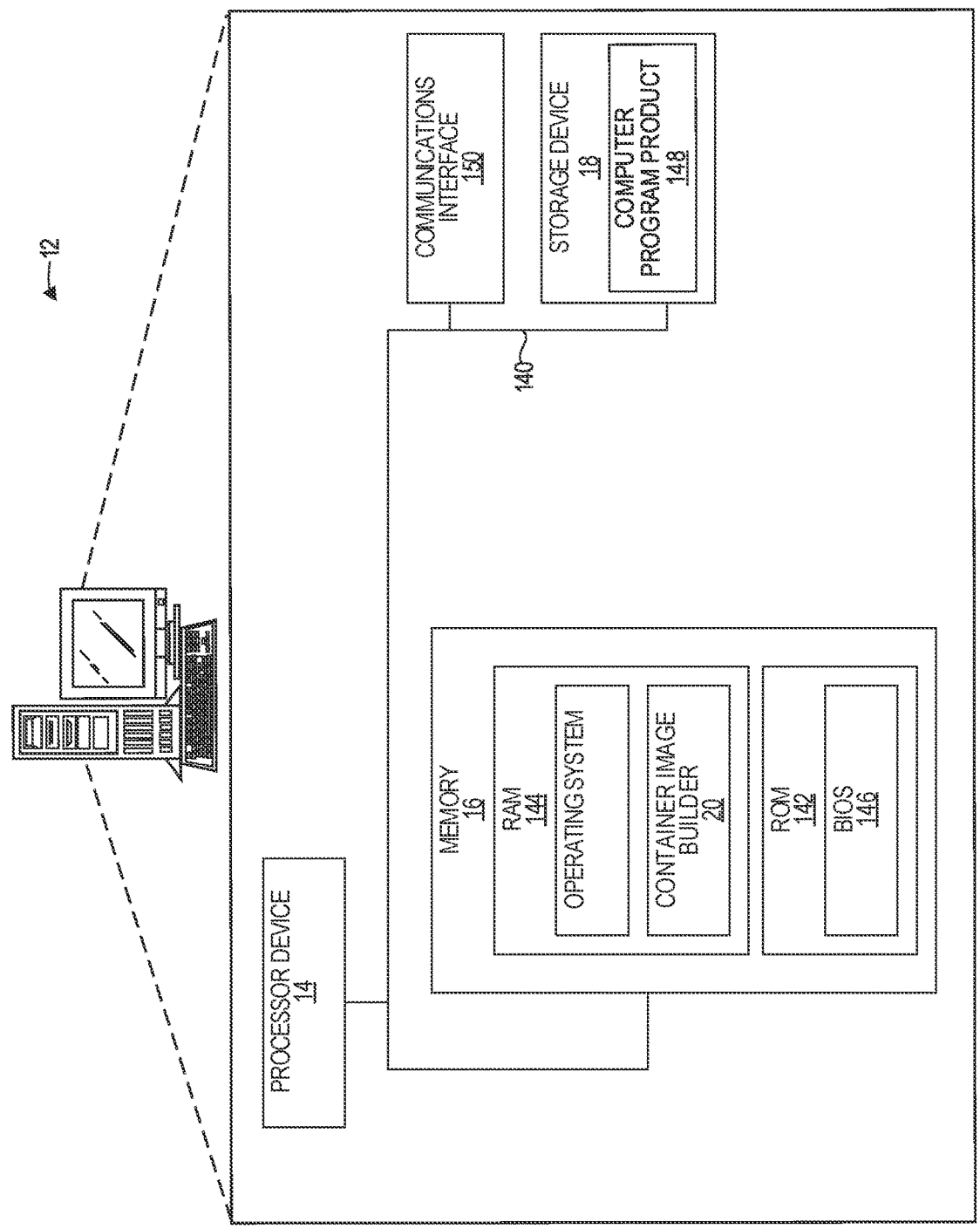
FIG. 5 is a block diagram of a computing device suitable for implementing examples according to one example.

FIG. 5 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the memory 16, and a system bus 140. The system bus 140 provides an interface for system components including, but not limited to, the memory 16 and the processor device 14. The processor device 14 can be any commercially available or proprietary processor.

The memory 16 may include non-volatile memory 142 (e.g., read-only memory (ROM), erasable programmable read-only memory (EPROM), electrically erasable programmable read-only memory (EEPROM), etc.), and volatile memory 144 (e.g., random-access memory (RAM)). A basic input/output system (BIOS) 146 may be stored in the non-volatile memory 142 and can include the basic routines that help to transfer information between elements within the computing device 12. The volatile memory 144 may also include a high-speed RAM, such as static RAM, for caching data.

The computing device 12 may further include or be coupled to a non-transitory computer-readable storage medium such as the storage device 18, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 18 and in the volatile memory 144, including an operating system and one or more program modules, such as the container image builder 20, which may implement the functionality described herein in whole or in part.

All or a portion of the examples may be implemented as a computer program product 148 stored on a transitory or non-transitory computer-usable or computer-readable storage medium, such as the storage device 18, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the container image builder 20 in the volatile memory 144, may serve as a controller, or control system, for the computing device 12 that is to implement the functionality described herein.

The computing device 12 may also include a communications interface 150 suitable for communicating with the network 24 as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   accessing first dependency information associated with an application and that identifies a first set of dependencies necessary to generate a first application container image for the application, each dependency in the first set of dependencies comprising one or more files needed to generate the first application container image and to execute the first application container image;
   selecting a first dependency container image of one or more dependency container images, each dependency container image including a layer that includes one or more dependencies and the first dependency container image lacking at least one dependency identified in the first set of dependencies; and
   generating a new dependency container image using the first dependency container image and the at least one dependency, the new dependency container image including a layer that includes a copy of the layer that includes the one or more dependencies from the first dependency container image and a layer that includes the at least one dependency.

2. The method of claim 1 further comprising retrieving the first dependency container image from a container image registry prior to generating the new dependency container image.

3. The method of claim 1 further comprising storing the first dependency container image in a container image registry.

4. The method of claim 1 wherein the first dependency container image contains a larger number of the dependencies in the first set of dependencies than any other dependency container image.

5. The method of claim 1 wherein generating the new dependency container image using the first dependency container image and the at least one dependency comprises generating the new dependency container image such that the at least one dependency is in a separate container image layer from container image layers that contain dependencies from the first dependency container image.

6. The method of claim 1 further comprising downloading the at least one dependency from a dependency repository.

7. The method of claim 1 further comprising:
   accessing second dependency information that identifies a second set of dependencies associated with a second application container image;
   selecting the new dependency container image; and
   generating the second application container image from the new dependency container image.

8. A method comprising:
   accessing first dependency information associated with an application and that identifies a first set of dependencies necessary to generate a first application container image, each dependency in the first set of dependencies comprising one or more files needed to generate the first application container image and to execute the first application container image;
   selecting a first dependency container image of one or more dependency container images, each dependency container image including a layer that includes one or more dependencies; and
   generating the first application container image from the first dependency container image and any dependencies identified in the first set of dependencies that are not contained in the first dependency container image, the first application container image including a layer that includes a copy of the layer that includes the one or more dependencies from the first dependency container image and pointers to the first set of dependencies.

9. The method of claim 8 further comprising downloading the first dependency container image from a container image registry prior to generating the first application container image.

10. The method of claim 8 further comprising:
accessing second dependency information that identifies a second set of dependencies necessary to generate a second application container image;
selecting the first dependency container image; and
generating the second application container image from the first dependency container image and any dependencies identified in the second set of dependencies that are not contained in the first dependency container image.

11. The method of claim 10 wherein generating the first application container image comprises generating the first application container image to be associated with a first tenant of a cloud computing environment, and wherein generating the second application container image comprises generating the second application container image to be associated with a second tenant of the cloud computing environment.

12. A computing device, comprising:
a memory; and
a processor device coupled to the memory to:
   access first dependency information associated with an application and that identifies a first set of dependencies necessary to generate a first application container image for the application, each dependency in the first set of dependencies comprising one or more files needed to generate the first application container image and to execute the first application container image;
   select a first dependency container image of one or more dependency container images, each dependency container image including a layer that includes one or more dependencies and the first dependency container image lacking at least one dependency identified in the first set of dependencies; and
   generate a new dependency container image using the first dependency container image and the at least one dependency, the new dependency container image including a layer that includes a copy of the layer that includes the one or more dependencies from the first dependency container image and a layer that includes the at least one dependency.

13. The computing device of claim 12 wherein the first dependency container image contains a larger number of the dependencies in the first set of dependencies than any other dependency container image.

14. The computing device of claim 12 wherein to generate the new dependency container image, the processor device is further to generate the new dependency container image such that the at least one dependency is in a separate container image layer from container image layers that contain dependencies from the first dependency container image.

15. The computing device of claim 12 wherein the processor device is further to:
   access second dependency information that identifies a second set of dependencies associated with a second application container image;
   select the new dependency container image; and
   generate the second application container image from the new dependency container image.

* * * * *